United States Patent [19]

Barnhard, Jr. et al.

[11] Patent Number: 5,265,007
[45] Date of Patent: Nov. 23, 1993

[54] CENTRAL CHECK CLEARING SYSTEM

[75] Inventors: John L. Barnhard, Jr., Worthington; Thomas K. Bowen, Westerville; Terry L. Geer, Baltimore; John W. Liebersbach, Gahanna, all of Ohio

[73] Assignee: Huntington Bancshares Incorporated, Columbus, Ohio

[21] Appl. No.: 390,623

[22] Filed: Aug. 7, 1989

Related U.S. Application Data

[63] Continuation-in-part of Ser. No. 203,489, Jun. 7, 1988, abandoned.

[51] Int. Cl.$^5$ .................. G06F 15/20; G06G 7/52
[52] U.S. Cl. ................................. 364/408; 235/379
[58] Field of Search .............. 364/406, 408; 902/24, 902/39, 40; 235/379

[56] References Cited

U.S. PATENT DOCUMENTS

| | | | |
|---|---|---|---|
| 4,172,552 | 10/1979 | Case et al. .................. | 902/40 X |
| 4,270,042 | 5/1981 | Case .............................. | 902/40 X |
| 4,358,671 | 11/1982 | Case .............................. | 902/40 X |
| 4,523,330 | 6/1985 | Cain .............................. | 902/40 X |
| 4,694,397 | 9/1987 | Grant et al. .................. | 902/40 X |
| 4,727,243 | 2/1988 | Savar ............................ | 902/40 X |
| 4,823,264 | 4/1989 | Deming ........................ | 902/40 X |

OTHER PUBLICATIONS

A. Greenspan, "Clearing and Settlement: Past and Future", American Banker, Oct. 26, 1990, p. 4.
"Proposals for Long-Term Improvements to the Check Collection System", American Banker Plus, Feb. 4, 1988.
"Electronic Payments Volume Will Gain at Corporations", American Banker, Dec. 5, 1983, p. 30.
"Boycott of Automated Clearing System in London Is Said Close to Resolution" American Banker, Mar. 28, 1984, p. 2.

Primary Examiner—Roy N. Envall, Jr.
Assistant Examiner—Laura Brutman
Attorney, Agent, or Firm—Porter, Wright, Morris & Arthur

[57] ABSTRACT

A central check clearing association by which different member banks and financial institutions can each settle debit and credit balances with respect to other member institutions on a predetermined periodic basis and methods and systems by which the association is operable. The system and method is independent of conventional central bank district geographic and institutional boundaries and time zones.

6 Claims, 1 Drawing Sheet

FIGURE 1

CENTRAL CHECK CLEARING SYSTEM

RELATED APPLICATION

This is a continuation-in-part of our copending application Ser. No. 07/203,489 filed on Jun. 7, 1988, now abandoned.

FIELD OF THE INVENTION

This invention relates to an exchange and settlement system to be used by banks for financial instrument clearings. More particularly, the invention comprises a central check clearing association and a control system therefor by which different member banks and financial institutions can each settle by debit and credit entries for checks drawn on other member institutions and certain non-member institutions on a predetermined periodic basis and means by which the association and the control system for the association is operable. The system and method is independent of conventional central bank district geographic and institutional boundaries, and time zones. In the system, checks can also be sent to members for clearing on behalf of non-member correspondent banks. As used herein, "checks" includes standard banking checks and other "cash items" as that latter term is conventionally used in the banking industry.

BACKGROUND OF THE PRIOR ART

Check clearing systems are well known in the banking industry and generally operate locally or through the Federal Reserve Bank settlement system. On a predetermined periodic basis, checks and other financial instruments drawn against a payer bank are submitted for payment and collection. Where, in a system, there are multiple institutions on which checks are drawn and which checks are in the possession of multiple members, clearinghouse systems are known in which the debit/credit balances of members with respect to the others are reconciled on a daily basis and payments to reconcile a net zero balance are made.

OBJECTS OF THE INVENTION

It is an object of this invention to provide means whereby an association composed of participating banks in major cities is formed, and a national clearinghouse system is maintained. At least one institutional participant in each city would have access to the local clearinghouse. Participating member banks would each agree to receive items drawn on the individual participant and on other members of its local clearinghouse in that city. The members of the local clearinghouse need not be members of the national clearinghouse, and items cleared by the national association include items drawn on local clearinghouse members who do not belong to the national association. As used herein, reference to "national clearinghouse" may also include a system having participants in different nations joined in a single association according to the system described herein. A "national" association, however, because of currency uniformity in a single nation is most feasible.

In its function, the association would provide a central accounting means such as a conventional programmable computer or other central processing unit for the computation of the settlements among participating banks. Physical delivery of items would be accomplished through air and ground transportation, and real time electronic tracking of cash letters transmitted through the transportation system is permitted. Advice of the sending of cash letters would be received electronically by the association's central accounting means from the participating institutions sending such cash letters, and confirmations of receipt would also be electronically transmitted by participants receiving such cash letters. Preferably, the electronic information transmitted through the system would be encrypted.

The detailed accounting entries required to accomplish a net settlement among participants on a periodic basis (typically daily) would be prepared by the central accounting means of the association. In the United States banking system, national settlement would be completed by debit and credit of the participant's accounts, or wire advice to the participant's accounts through the Federal Reserve settlement system.

DESCRIPTION OF THE PREFERRED EMBODIMENT

In its preferred embodiment applicable to the United States banking system, this invention comprises a centralized clearinghouse system including an association of selected member financial institutions. A clearing system is maintained by a central control means in which debits and credits owing from one member to another are calculated on a predetermined periodic basis without regard to Federal Reserve System district settlements, in which the participants report the value and transit status of items to be cleared to the central control means; and in which the central control means monitors on a real time basis the actual sending and receipt of, and the dollar amount of items being cleared, as reported by the participants, and records the sending and receipt of the aggregate amount of the actual financial instruments transported, as reported by the participants, (subject to timely reporting of adjustments, returns and the like) and thereafter calculates the net settlements among the participants and initiates the corresponding debits and credits necessary to effect settlement among members in the Federal Reserve settlement systems. In the system, before the calculation of the net settlement, the receiving bank records and enters into the central control means any adjustments and any return items after transmission of the items which may affect the net settlement.

In the system of the invention, physical transport of financial instruments between and among the members is controlled by a predetermined time schedule, and the national settlement of the individual members of the association is achieved at a time not later than local settlements by members of the national association are completed.

Organization of the system requires strict maintenance of predetermined association parameters. The clearinghouse is independent of conventional geographical and institutional boundaries such as Federal Reserve districts, as well as time zones. In the association, all participants must be members of the national clearinghouse association, and all member banks must agree to accept and process items drawn on themselves and on banks within the local clearinghouse of which they are also a member. The local clearinghouse rules, means of exchange and procedures are entirely separate from that of the system. All member banks of the national association must agree to use the central settlement system, and all settlements would be either same day settlements or based on some other acceptable periodic or predetermined time schedule. In the United States Federal Reserve System, settlements accomplished by the national association described herein would preferably occur after the daily scheduled local clearinghouse settlements are accomplished. Strict adherence to a time schedule prescribed by the association for providing debit and credit advice and the physical exchange of items is required.

A high dollar return notification (i.e., $2,500.00) is mandatory, as is high dollar adjustment notification. All cash letters received must be confirmed by the receiving bank through the association's accounting system. Members typically should be able to guarantee minimum dollar amounts and transaction volumes to be able to participate in the association's clearinghouse system. Selection criteria for members may consider geographic locations, time zones, commercial standing and membership in other banking associations, as well as other criteria appropriate for a coordinated clearinghouse system.

In a central accounting means, all national settlements among participants in the national associations will be posted from the association's accounting system to the accounts of the participants at the Federal Reserve System (or a pass-through bank). The net of the day's activity for each institution will reflect the bank's position in the system with respect to other members. By means of the central accounting system, each member will be able electronically to inquire into the accounting system throughout the day, on a real time basis, to manage and reconcile funds in anticipation of settlement. In accordance with a strictly defined time schedule, all activity must be confirmed by the receiving bank prior to final settlement. If a member or members cannot settle, an unwinding mechanism is provided by a control means in the accounting system; and the system would recompute the settlement without the inclusion of the items sent to the non-settling member or members. The national clearinghouse association does not itself effect settlement among the members; member settlement occurs through the Federal Reserve System based on computations made by the control means which are transmitted to one of the Federal Reserve Banks. That one Federal Reserve Bank, in turn, will send entries to other Federal Reserve Banks to effect "nationwide" settlements in other districts.

A principal object of and advantage achieved by the proposed clearinghouse association is to expedite the forward collection of items and the return of items. When forward collection is expedited, float is reduced, the speed of availability of funds is increased and costs are reduced.

Another advantage is the overall adoption of a uniform set of standards among members to cover all legal and operational aspects of the system. By agreeing to be governed by the association's bylaws, many existing agreements between clearing banks can be standardized and greater operational efficiencies achieved as a result. Further, the proposed clearinghouse association will reduce overall risks in the payment system by reducing the risks associated with daylight overdrafts and by minimizing the disruption to the overall system which would result if a member cannot settle.

The status of participant's accounts in the national clearinghouse association is recorded and displayed instantaneously as soon as information is received by the central control means. Account reconcilement occurs at a predetermined time each day when the net settlement is calculated after each member completes its reports. However, with reference to the sequence depicted in FIG. 1 in the United States system, the critical timing element of the system is that national settlement through the Federal Reserve System occurs not later than the settlements of local clearinghouses.

Figure 1:
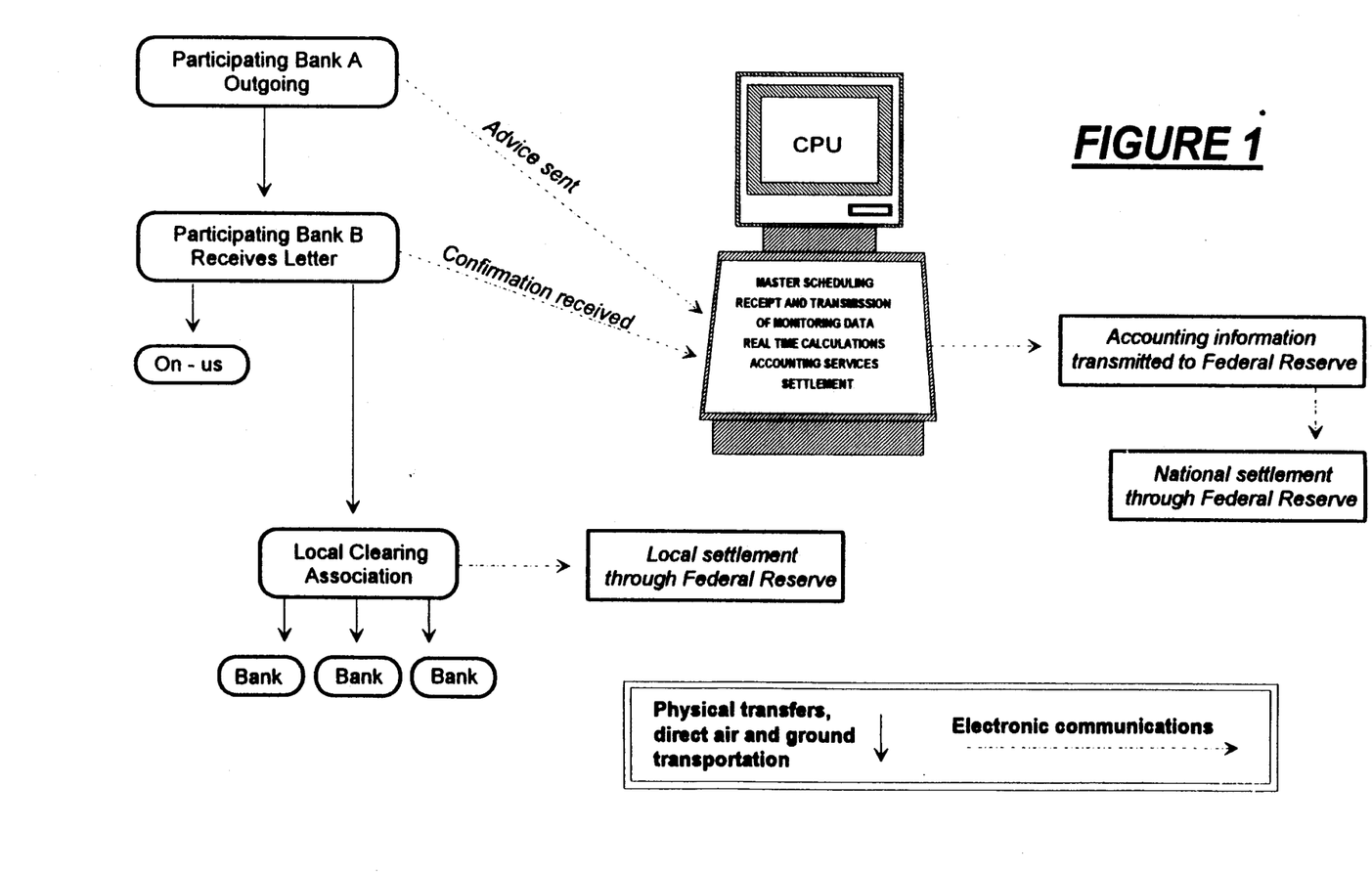
FIG. 1 shows an overall flow chart of operations in a national clearing association in the United States which includes: (1) the centralized monitoring and control means necessary for the association operations; and (2) the linkages of the various elements of the system by physical transfer and electronic communications.

FIG. 1 shows an illustrative linkage of participants in the clearinghouse as presentation and payment functions are connected by physical transfer by air or ground transportation of the actual checks or drafts that are to be cleared and by electronic communications between the participants, concerning information about the value and status of transport of the items sent by member banks. In the example of FIG. 1, the relative position of participating banks A and B with respect to each other are monitored by the central control means of the National Clearing Association. Bank B may participate in a local clearing association that includes a number of banks that are not members of the National Clearing Association. The "On us" reference in FIG. 1 denotes items drawn on Bank B and payable by Bank B that are not exchanged in the local clearinghouse. After local settlement by Bank B and the physical transfer of items in the local clearing association, the National Clearing Association will calculate the respective debit/credit balances of Bank A and Bank B (not only to each other but to all other participating banks) and transmit the same information to the Federal Reserve for the national banking system settlement. Settlement in the National Clearing Association is wholly independent of settlement or liability of settlement in the local clearinghouses.

In the preferred embodiment, sorting of checks between member and non-member local clearinghouse banks is done by the receiving bank. This permits the sending bank to assemble checks for sending without sorting, except for a first sort by member locality, and permits the receiving bank thereafter to sort its local checks when its sort machines would otherwise not be in peak use. Presentation of checks for payment is thereby expedited.

Each participant in the proposed association will be better able to monitor its net settlement position throughout the banking day. On a daily basis, local clearinghouse settlements will occur before settlement by the national clearing association. In addition, reliance upon large wire transfers through the Federal Reserve Bank wire network, which is created by the present environment in which many reciprocal clearing arrangements exist, will be reduced. Wire transfer fees between banks are significantly reduced or eliminated. The need for reciprocal private correspondent balances with other financial institutions for the purpose of check clearing will also be eliminated for members of the system with respect to other members.

The association will also establish a procedure in the event that a participant is unable to settle. In this event, the non-settling member's payments will be excluded; the accounting system of the association will revise the settlement entries to include only the deposits of the settling members of the association and will exclude items drawn on non-settling members.

In the event there is more than one member bank in a large city, means can be included in the system to allocate volume to equalize the flow of checks among the members. This may reflect pro-rata or other equitable distribution of a work load among system members.

EXAMPLE I

In the continental United States, there are 12 Federal Reserve Districts and 4 time zones that presently constitute obstacles to inter-district and inter-time zone settlements. Inter-city settlements by association member participant banks situated in different time zones and Federal Reserve Districts are conveniently effected by the control means and the system of the invention.

In any particular locality, the participating member would first effect local settlement. All non-local checks would be sorted according to the locality of the bank on which the checks were drawn and the aggregate value of such checks would be determined. In any event, non-local checks that are not submissible to the local clearinghouse are segregated from local checks, typically by a rough sort of checks according to MICR coding.

At a predetermined time, typically after the close of the banking day, each participating member: (1) will prepare and send for presentment to each other participating member all checks drawn on that other participating member; and (2) will send for collection all checks to be presented for payment which are drawn on non-participant banks in the other participating member's local clearing-house district. "Collection" and "presentment" are known technical terms in the banking industry. Thus, if membership in a check clearing association controlled by the means of the invention included 40 participants, each participant would usually send out in accordance with a fixed and predetermined processing time schedule, checks and accompanying cash letters to up to potentially 39 other participants. Each participant in turn would receive such items from up to potentially 39 other participants. The items presented would be drawn directly on participant and on non-participant banks located in the participant's local clearing system.

A.

A simplified two city settlement involving Los Angeles and New York as example localities is described. At a 12:00 midnight cut-off in Los Angeles, the Los Angeles bank should have completed its sorting and dispatched by air to New York the sorted New York checks. The Los Angeles bank may have determined that it had been presented with $1,000,000.00 of checks drawn in the New York area, including (1) a first quantity of checks valued at $800,000.00 drawn directly on the New York participant and (2) a second quantity of checks valued at $200,000.00 drawn on banks in the local New York clearinghouse district of which the New York participant is a member.

Physical transport of the checks may be by any means provided that scheduling requirements of the system are maintained. When the checks are dispatched to New York, the fact of transmittal, information about the transmittal of the checks and the total value transmitted are entered into the master association "switch". The two categories of checks represent the Los Angeles side of an anticipated settlement credited to the Los Angeles participant arising from (1) checks drawn on the New York participant and (2) checks sent for collection to be presented to other New York banks. Thus, all checks received in New York are potential credits to the Los Angeles participant. The checks drawn on the New York participant are debits of the New York participant. All the New York non-participant checks submitted will be recorded as credits to the Los Angeles participant. The "switch" is the central control means in which information about the Los Angeles transmittal is immediately entered. The switch may be an appropriately programmed digital computer having means for receipt and transmission of data as well as further arithmetic or algorithmic means, to reconcile or calculate debits and credits anticipated in an essentially "real time" basis among the participating members. Net settlement occurs at a single predetermined time each day when final debits and credits among the members are calculated and effected through Federal Reserve accounts. Software adapted to the system described herein may be devised by persons of skill in the financial programming computer arts. Communications to and from the switch may occur through conventional telephone links by modem connections and the like.

Immediately upon physical receipt of the checks, the New York participant enters information about the receipt of $1,000,000.00 in checks into the switch. Thus, the Los Angeles bank receives potential or anticipated credits of $1,000,000.00 in two categories: (1) checks drawn on the participant New York bank and presented for payment; and (2) checks for collection drawn on other banks in the New York area that are members of the New York participant bank's local clearinghouse. These anticipated credits are recorded in the switch. The anticipated credit of $800,000.00 in the first category thus becomes an actual credit upon subsequent settlement. (The anticipated credit may be adjusted during the settlement process to produce the actual credit.) As promptly as possible in accordance with local New York clearinghouse rules, the New York participant presents the remaining $200,000.00 of checks in favor of the Los Angeles participant drawn on non-participant New York banks for settlement at the local New York clearinghouse on behalf of the Los Angeles participant. Thus, the Los Angeles participant obtains same day availability for all checks drawn on the New York participant, and when non-participant checks are presented to the New York clearinghouse that same day, the Los Angeles participant also obtains same day availability of cash from the non-participants' checks drawn on New York clearinghouse banks.

The receipt of the Los Angeles checks in New York is immediately reported to the switch or control means, and the subsequent settlements of the participant and non-participant checks are calculated by the control means to determine settlement. The New York to Los Angeles reporting and settlement procedures follow the same format, as does any other locality shipment of checks to be cleared.

A number of significant advantages are achieved through the system control means by which shipment and receipt schedules are fixed and "real time" reports of shipment and receipt are made to and accessible from the control means. The control provides a means of monitoring anticipated settlements as a result of the information recorded.

A principal advantage is the considerably enhanced availability of funds, typically on a same day basis.

Rough sorted check shipments to out-of-locality banks arrive and are fine sorted by the receiving participant when the receiving participant's sorters are not in peak use. Thus the system utilizes non-peak time and involves only marginal cost connected with expensive sorting mechanisms. In addition, a check sort can be based on many parameters. The system only requires that a sending participant rough sort (by locality) in order to send to a participant that will thereafter do a fine sort by bank within the locality for local settlement. Thus, the time within which as many checks as possible may be processed is increased, yet mechanical requirements for sorters need not be increased.

The control means monitors information about shipments and receipts from each participant. Through the means, each participant sends and receives information from the others. Each participant can address the system to determine, at any point in time, anticipated (shipped and in transit) and received checks and the accompanying "cash letter" that is included in each shipment. (A "cash letter" is a banking industry term referring to a listing, and total, of all checks within a shipment.)

Such information is of considerable importance to a participant's investment department, which requires such information to insure effective use of cash on hand and cash anticipated to be received, or to insure that sufficient cash is available to make settlements. Thus, the control means provides a real time indication of cash needs anticipated for purposes of Federal Reserve settlement.

In contrast, the Federal Reserve System typically is not as quick, and alternative correspondent systems are subject to higher fees. The present system may be devised such that no separate fees are charged among members, and association membership is a shared cost. Each participant agrees to receive all items submitted by any other participant. The system reduces risk and float time and presents added time and knowledge by which inter-bank settlements may be made and intra-bank finances may be adjusted.

What is claimed is:

1. A mechanism for physically exchanging financial instruments among a number of pre-selected financial institutions, each located at a preselected site, and for effecting the regular periodic settlement of the exchanged instruments among the institutions including:
   (A) means within each of the pre-selected institutions:
      (1) for sending and receiving the instruments, said means for sending including means for physically transporting the instruments from an institution at one site to each other of the institutions at the other sites, said means for receiving including means for physically accepting the instruments transported from the other institutions;
      (2) for sending to and receiving from a central processing unit connected to each institution information reporting in real time in correspondence with the occurrence of an event (a) the value of the instruments transported; and (b) the transport status of the instruments with respect to their having been (i) sent and (ii) received; and
      (3) for receiving from the central processing unit a calculated value (a) on a real time basis and (b) on a regular periodic settlement basis, information regarding the debits and credits owing to or payable by an institution with respect to each other of the institutions with regard to instruments sent and received;
   (B) a central processing unit connected to each of the pre-selected institutions including
      (1) means for continuous monitoring on a real time basis, as reported by each institution by the means for sending information within each institution;
         (a) (i) the sending and receipt status of the instruments and (ii) the value of the instruments sent and received, as reported by each of the institutions, and
         (b) the status in transit of the instruments with respect to their having been (i) sent and (ii) received, as reported by each of the institutions, according to the reporting of an institution's sending and receiving of instruments,
      (2) means for calculating debits and credits, based on the value of the instruments sent and received by the institutions, as monitored on a real time basis from information reported by the institutions, of (a) the amount owing from or payable to each one of the pre-selected institutions with respect to each of the other institutions and (b) an aggregate amount owing from or payable to each one of the pre-selected institutions with respect to all of the other institutions; and
      (3) means for sending to each institution the information monitored with respect to instruments sent to an institution and the value of such instruments; and
   (C) a cycling means interrelated with the central processing unit (a) for controlling the physical transport of the financial instruments among the institutions and (b) for controlling the means for calculating such that a final calculation of the debits and credits owing from or payable to, with respect to each of the institutions with regard to each other of the institutions, comprising the occurrence of the regular periodic settlement among the institutions, does not occur until pre-determined local settlements by the institutions in the pre-selected sites with institutions that are not among the number of pre-selected financial institutions, are completed.

2. The mechanism of claim 1 further including a means at an institution by which instruments are sorted by the site locality of each other of the pre-selected institutions and in which the instruments sorted by site are sent by site sort category to institutions at sites within the site sort categories.

3. The mechanism of claim 2 further including a sorter at an institution which receives the instruments which sorter sorts the instruments received according to categories of:
   (1) instruments drawn on the receiving institution; and
   (2) instruments drawn on institutions within the site that are not among the number of pre-selected financial institutions.

4. A system for a financial clearinghouse comprised of an association of selected member financial institution participants situated in different localities including:
   A. means at each of the participants (1) for sending and receiving financial instruments to be cleared and (2) for sending and receiving in real time information reporting the value and transit status of the financial instruments to be cleared, to a programmed central processing unit, and (3) for addressing the central processing unit by which a participant may determine in real time the information received by the processing unit with respect to that participant's relative credit and debit obligations with respect to other institutions arising from the instruments that are reported to be sent and received;

B. a programmed central processing unit including:

means for calculating debits and credits owing from or payable (1) to one member to another member and (2) from or to one member to all other members, based upon the value of instruments reported by a participant as having been sent and received;

means for receiving and recording a participant's reports of the value and transit status of the instruments to be cleared as having been sent and received with respect to all participants in the system; and means for monitoring on a real time as reported basis (1) the actual sending from and receipt by a participant of the value of instruments being cleared as reported by the participants, and (2) the sending from and receipt by a participant of the actual instruments being cleared, said means for monitoring being operatively interconnected to the means for calculating whereby debits and credits owing from one member to another may be determined and monitored on a continuous basis in real time as reports of the value and transit status of the instruments to be cleared are reported by the participants and received by the processing unit; and C. a time control for determining the time of physical transport of financial instruments between and among the participants according to a predetermined time cycle, and for determining the occurrence of a final settlement by the clearinghouse participants at a pre-determined time until after a time that certain pre-determined local settlements in the localities, by the participants in the localities, are completed.

5. The system of claim 4 further including a sorter machine which separates the instruments in pre-determined sort categories according to localities to which the instruments are sent.

6. The system of claim 5 further including a sorter machine operated by a receiving participant for sorting the instruments received by the participant according to categories of:

(1) instruments drawn on that participant; and (2) instruments drawn on different financial institutions in the locality which are not participants in the clearinghouse.

* * * * *

UNITED STATES PATENT AND TRADEMARK OFFICE
CERTIFICATE OF CORRECTION

PATENT NO. : 5,265,007 Page 1 of 1
APPLICATION NO. : 07/390623
DATED : November 23, 1993
INVENTOR(S) : John L. Barnhard, Jr. et al.

It is certified that error appears in the above-identified patent and that said Letters Patent is hereby corrected as shown below:

Column 8, lines 7-8, delete "institution;" and insert --institution:-- therefor.

Signed and Sealed this

Eighth Day of May, 2007

JON W. DUDAS
*Director of the United States Patent and Trademark Office*

US005265007C1

(12) EX PARTE REEXAMINATION CERTIFICATE (6647th)
United States Patent
Barnhard, Jr. et al.

(10) Number: US 5,265,007 C1
(45) Certificate Issued: Feb. 10, 2009

(54) CENTRAL CHECK CLEARING SYSTEM (75) Inventors: John L. Barnhard, Jr., Worthington, OH (US); Thomas K. Bowen, Westerville, OH (US); Terry L. Geer, Baltimore, OH (US); John W. Liebersbach, Gahanna, OH (US)

(73) Assignee: Datatreasury Corporation, Plano, TX (US)

Reexamination Request:
No. 90/008,686, Jun. 8, 2007

Reexamination Certificate for:
Patent No.: 5,265,007
Issued: Nov. 23, 1993
Appl. No.: 07/390,623
Filed: Aug. 7, 1989

Certificate of Correction issued May 8, 2007.

Related U.S. Application Data (63) Continuation-in-part of application No. 07/203,489, filed on Jun. 7, 1988, now abandoned.

(51) Int. Cl.
*G06G 7/52* (2006.01)
*G06F 19/00* (2006.01)

(52) U.S. Cl. .......................... 705/45; 235/379
(58) Field of Classification Search .................. 235/379; 705/45
See application file for complete search history.

(56) References Cited

U.S. PATENT DOCUMENTS

| | | | |
|---|---|---|---|
| 4,017,101 A | 4/1977 | Case | |
| 4,172,552 A | 10/1979 | Case et al. | |
| 4,201,978 A | 5/1980 | Nally | |
| 4,205,780 A | 6/1980 | Burns et al. | |
| 4,264,808 A | 4/1981 | Owens et al. | |
| 4,268,715 A | 5/1981 | Atalla | |
| 4,270,042 A | 5/1981 | Case | |
| 4,321,672 A | 3/1982 | Braun et al. | |
| 4,326,258 A | 4/1982 | de la Guardia | |
| 4,358,671 A | 11/1982 | Case | |
| 4,404,649 A | 9/1983 | Nunley et al. | |
| 4,417,136 A | 11/1983 | Rushby et al. | |
| 4,448,419 A | 5/1984 | Telnaes | |
| 4,457,015 A | 6/1984 | Nally et al. | |
| 4,500,750 A | 2/1985 | Erlander et al. | |
| 4,523,330 A | 6/1985 | Cain | |
| 4,555,617 A | 11/1985 | Brooks et al. | |
| 4,578,530 A | 3/1986 | Zeidler | |
| 4,652,990 A | 3/1987 | Pailen et al. | |
| 4,675,815 A | 6/1987 | Kuroki et al. | |
| 4,680,803 A | 7/1987 | Dilella | |
| 4,694,147 A | 9/1987 | Amemiya et al. | |
| 4,694,397 A | 9/1987 | Grant et al. | |
| 4,723,283 A | 2/1988 | Nagasawa et al. | |

(Continued)

FOREIGN PATENT DOCUMENTS

| | | |
|---|---|---|
| CA | 2131667 | 6/1995 |
| EP | 0 454 303 | 10/1991 |
| EP | 0 481 135 | 4/1992 |

(Continued)

OTHER PUBLICATIONS

"Defendant Bank of America's Motion for Summary Judgment for Claim Invalidity Based on Indefiniteness of U.S. Patent No. 5,265,007," pp. 1–15, filed Jun. 8, 2007, in *Data Treasury Corporation v. Wells Fargo & Company, et al.,* Civil Action No. 2:06–CV–72 (DF), In the United States District Court for the Eastern District of Texas, Marshall Division, Including Exhibits B–D.

(Continued)

*Primary Examiner*—Jimmy G. Foster (57) ABSTRACT

A central check clearing association by which different member banks and financial institutions can each settle debit and credit balances with respect to other member institutions on a predetermined periodic basis and methods and systems by which the association is operable. The system and method is independent of conventional central bank district geographic and institutional boundaries and time zones.

U.S. PATENT DOCUMENTS

| | | | |
|---|---|---|---|
| 4,727,243 A | 2/1988 | Savar | |
| 4,742,457 A | 5/1988 | Leon et al. | |
| 4,745,267 A | 5/1988 | Davis et al. | |
| 4,747,058 A | 5/1988 | Ho | |
| 4,748,557 A | 5/1988 | Tamada et al. | |
| 4,750,201 A | 6/1988 | Hodgson et al. | |
| 4,755,940 A | 7/1988 | Brachtl et al. | |
| 4,757,543 A | 7/1988 | Tamada et al. | |
| 4,771,460 A | 9/1988 | Tamada et al. | |
| 4,823,264 A | 4/1989 | Deming | |
| 4,843,220 A | 6/1989 | Haun | |
| 4,858,121 A | 8/1989 | Barber et al. | |
| 4,882,779 A | 11/1989 | Rahtgen | |
| 4,888,812 A | 12/1989 | Dinan et al. | |
| 4,910,774 A | 3/1990 | Barakat | |
| 4,912,762 A | 3/1990 | Lee et al. | |
| 4,922,503 A | 5/1990 | Leone | |
| 4,926,325 A | 5/1990 | Benton et al. | |
| 4,941,125 A | 7/1990 | Boyne | |
| 4,948,174 A | 8/1990 | Thomson et al. | |
| 4,960,981 A | 10/1990 | Benton et al. | |
| 4,961,142 A | 10/1990 | Elliott et al. | |
| 4,962,531 A | 10/1990 | Sipman et al. | |
| 4,972,463 A | 11/1990 | Danielson et al. | |
| 4,974,878 A | 12/1990 | Josephson | |
| 4,977,595 A | 12/1990 | Ohta et al. | |
| 4,985,921 A | 1/1991 | Schwartz | |
| 5,003,594 A | 3/1991 | Shinagawa | |
| 5,014,311 A | 5/1991 | Schrenk | |
| 5,016,277 A | 5/1991 | Hamilton | |
| 5,050,078 A | 9/1991 | Sansone | |
| 5,053,607 A | 10/1991 | Carlson et al. | |
| 5,054,096 A | 10/1991 | Beizer | |
| 5,081,680 A | 1/1992 | Bennett | |
| 5,091,968 A | 2/1992 | Higgins et al. | |
| 5,097,517 A | 3/1992 | Holt | |
| 5,122,950 A | 6/1992 | Benton et al. | |
| 5,123,047 A | 6/1992 | Rosenow | |
| 5,144,115 A | 9/1992 | Yoshida | |
| 5,159,548 A | 10/1992 | Caslavka | |
| 5,163,098 A | 11/1992 | Dahbura | |
| 5,168,444 A | 12/1992 | Cukor et al. | |
| 5,170,466 A | 12/1992 | Rogan et al. | |
| 5,173,594 A | 12/1992 | McClure | |
| 5,175,682 A | 12/1992 | Higashiyama et al. | |
| 5,175,766 A | 12/1992 | Hamilton | |
| 5,185,798 A | 2/1993 | Hamada et al. | |
| 5,187,750 A | 2/1993 | Behera | |
| 5,195,133 A | 3/1993 | Kapp et al. | |
| 5,198,975 A | 3/1993 | Baker et al. | |
| 5,200,993 A | 4/1993 | Wheeler | |
| 5,204,811 A | 4/1993 | Bednar et al. | |
| 5,214,697 A | 5/1993 | Saito | |
| 5,220,501 A | 6/1993 | Lawlor et al. | |
| 5,233,656 A | 8/1993 | Landgrand et al. | |
| 5,235,433 A | 8/1993 | Clarkson et al. | |
| 5,237,158 A | 8/1993 | Kern et al. | |
| 5,237,159 A | 8/1993 | Stephens et al. | |
| 5,237,500 A | 8/1993 | Perg et al. | |
| 5,241,600 A | 8/1993 | Hillis | |
| 5,256,863 A | 10/1993 | Ferguson et al. | |
| 5,259,025 A | 11/1993 | Monroe et al. | |
| 5,265,007 A | 11/1993 | Barnhard, Jr. et al. | |
| 5,274,567 A | 12/1993 | Kallin et al. | |
| 5,283,829 A | 2/1994 | Anderson | |
| 5,287,497 A | 2/1994 | Behera | |
| 5,317,637 A | 5/1994 | Pichlmaier et al. | |
| 5,321,238 A | 6/1994 | Kamata et al. | |
| 5,321,751 A | 6/1994 | Ray et al. | |
| 5,321,816 A | 6/1994 | Rogan et al. | |
| 5,326,959 A | 7/1994 | Perazza | |
| 5,337,358 A | 8/1994 | Axelrod et al. | |
| 5,341,428 A | 8/1994 | Schatz | |
| 5,343,529 A | 8/1994 | Goldfine et al. | |
| 5,345,090 A | 9/1994 | Hludzinski | |
| 5,373,550 A | 12/1994 | Campbell et al. | |
| 5,396,558 A | 3/1995 | Ishiguro et al. | |
| 5,408,531 A | 4/1995 | Nakajima | |
| 5,412,190 A | 5/1995 | Josephson et al. | |
| 5,434,928 A | 7/1995 | Wagner et al. | |
| 5,436,970 A | 7/1995 | Ray et al. | |
| 5,440,634 A | 8/1995 | Jones et al. | |
| 5,444,794 A | 8/1995 | Uhland, Sr. | |
| 5,446,796 A | 8/1995 | Ishiguro et al. | |
| 5,454,575 A | 10/1995 | Del Buono | |
| 5,457,747 A | 10/1995 | Drexler et al. | |
| 5,473,143 A | 12/1995 | Vak et al. | |
| 5,479,510 A | 12/1995 | Olsen et al. | |
| 5,484,988 A | 1/1996 | Hills et al. | |
| 5,502,765 A | 3/1996 | Ishiguro et al. | |
| 5,506,691 A | 4/1996 | Bednar et al. | |
| 5,524,073 A | 6/1996 | Stambler | |
| 5,526,409 A | 6/1996 | Conrow et al. | |
| 5,528,705 A | 6/1996 | Reasoner, Jr. et al. | |
| 5,539,822 A | 7/1996 | Lett | |
| 5,539,825 A | 7/1996 | Akiyama et al. | |
| 5,544,043 A | 8/1996 | Miki et al. | |
| 5,544,255 A | 8/1996 | Smithies et al. | |
| 5,557,518 A | 9/1996 | Rosen | |
| 5,577,121 A | 11/1996 | Davis et al. | |
| 5,583,759 A | 12/1996 | Geer | |
| 5,590,038 A | 12/1996 | Pitroda | |
| 5,590,196 A | 12/1996 | Moreau | |
| 5,596,642 A | 1/1997 | Davis et al. | |
| 5,602,933 A | 2/1997 | Blackwell et al. | |
| 5,602,936 A | 2/1997 | Green et al. | |
| 5,604,640 A | 2/1997 | Zipf et al. | |
| 5,604,802 A | 2/1997 | Holloway | |
| 5,608,800 A | 3/1997 | Hoffmann et al. | |
| 5,613,001 A | 3/1997 | Bakhoum | |
| 5,615,269 A | 3/1997 | Micali | |
| 5,621,796 A | 4/1997 | Davis et al. | |
| 5,621,797 A | 4/1997 | Rosen | |
| 5,623,547 A | 4/1997 | Jones et al. | |
| 5,625,694 A | 4/1997 | Lee et al. | |
| 5,629,981 A | 5/1997 | Nerlikar | |
| 5,633,930 A | 5/1997 | Davis et al. | |
| 5,642,419 A | 6/1997 | Rosen | |
| 5,647,017 A | 7/1997 | Smithies et al. | |
| 5,657,389 A | 8/1997 | Houvener | |
| 5,657,396 A | 8/1997 | Rudolph et al. | |
| 5,659,616 A | 8/1997 | Sudia | |
| 5,668,897 A | 9/1997 | Stolfo | |
| 5,673,333 A | 9/1997 | Johnston | |
| 5,682,549 A | 10/1997 | Tanaka et al. | |
| 5,708,810 A | 1/1998 | Kern et al. | |
| 5,710,889 A | 1/1998 | Clark et al. | |
| 5,717,868 A | 2/1998 | James | |
| 5,751,842 A | 5/1998 | Riach et al. | |
| 5,754,673 A | 5/1998 | Brooks et al. | |
| 5,760,916 A | 6/1998 | Dellert et al. | |
| 5,781,654 A | 7/1998 | Carney | |
| 5,784,503 A | 7/1998 | Bleecker, III et al. | |
| 5,784,610 A | 7/1998 | Copeland, III et al. | |
| 5,787,403 A | 7/1998 | Randle | |
| 5,790,260 A | 8/1998 | Meyers | |
| 5,801,366 A | 9/1998 | Funk et al. | |
| 5,825,506 A | 10/1998 | Bednar et al. | |
| 5,832,463 A | 11/1998 | Funk | |
| 5,832,464 A | 11/1998 | Houvener et al. | |
| 5,857,034 A | 1/1999 | Tsuchiya et al. | |

| 5,870,725 A | 2/1999 | Bellinger et al. |
| 5,884,271 A | 3/1999 | Pitroda |
| 5,910,988 A | 6/1999 | Ballard |
| 5,926,288 A | 7/1999 | Dellert et al. |
| 5,930,778 A | 7/1999 | Geer |
| 5,973,731 A | 10/1999 | Schwab |
| 6,032,137 A | 2/2000 | Ballard |
| 6,059,185 A | 5/2000 | Funk et al. |
| 6,108,104 A | 8/2000 | Tesavis |
| 6,115,509 A | 9/2000 | Yeskel |
| 6,145,738 A | 11/2000 | Stinson et al. |

FOREIGN PATENT DOCUMENTS

| EP | 0 519 843 | 12/1992 |
| EP | 0 593 209 | 4/1994 |
| EP | 0661654 A2 | 7/1995 |
| EP | 0 671 696 | 9/1995 |
| EP | 0 678 829 | 10/1995 |
| GB | 2 251 098 | 6/1992 |
| GB | 2 294 566 | 5/1996 |
| WO | WO 90/04837 A | 5/1990 |
| WO | WO 91/06058 A | 5/1991 |
| WO | WO 92/10901 | 6/1992 |
| WO | WO 93/02424 | 2/1993 |
| WO | WO 95/12859 | 5/1995 |
| WO | WO 95/30199 | 11/1995 |
| WO | WO 97/07468 | 2/1997 |
| WO | WO 97/22060 | 6/1997 |
| WO | WO 97/36254 | 10/1997 |
| WO | WO 97/36266 | 10/1997 |
| WO | WO 97/36267 | 10/1997 |
| WO | WO 97/38402 | 10/1997 |
| WO | WO 98/47100 A | 10/1998 |
| WO | WO 98/58356 A | 12/1998 |

OTHER PUBLICATIONS

"Plaintiff's Response to Defendant's Motion for Summary Judgment of Claim Invalidity Based on Indefiniteness for U.S. Patent No. 5,265,007," pp. 1–32, filed Jun. 25, 2007, in *DataTreasury Corporation v. Wells Fargo & Company, et al.*, Civil Action No. 2:06–CV–72 (DF), Jury Trial Demand, In the United States District Court for the Eastern District of Texas, Marshall Division.

"Declaration of Nicole Reed in Support of Plaintiff's Response to Defendant's Motion for Summary Judgment of Claim Invalidity Based on Indefiniteness for U.S. Patent No. 5,265,007," pp. 1–2, filed Jun. 25, 2007, in *DataTreasury Corporation v. Wells Fargo & Company, et al.*, Civil Action No. 2:06–CV–72 (DF), Jury Trial Demand, In the United States District Court for the Eastern District of Texas, Marshall Division, Including Exhibits B–E.

"Defendant Bank of America's Reply in Support of its Motion for Summary Judgment of Claim Invalidity Based on Indefiniteness of U.S. Patent No. 5,265,007," pp. 1–12, filed Jul. 12, 2007, in *DataTreasury Corporation v. Wells Fargo & Company, et al.*, Civil Action No. 2:06–CV–72 (DF), In the United States District Court for the Eastern District of Texas, Marshall Division.

"Plaintiff's Sur–reply to Defendant's Motion for Summary Judgment for Claim Invalidity Based on Indefiniteness of U.S. Patent No. 5,265,007," pp. 1–10, filed Jul. 23, 2007, in *DataTreasury Corporation v. Wells Fargo & Company, et al.*, Civil Action No. 2:06–CV–72 (DF), Jury Trial Demand, In the United States District Court for the Eastern District of Texas, Marshall Division.

A. Greenspan, "Clearing and Settlement: Past and Future", American Banker, Oct. 26, 1990, p. 4.

"Proposals for Long–Term Improvements to the Check Collection System", American Banker Plus, Feb. 4, 1988.

"Electronic Payments Volume Will Gain at Corporations", American Banker, Dec. 5, 1983, p. 30.

"Boycott of Automated Clearing System in London is Said Close to Resolution", American Banker, Mar. 28, 1984, p. 2.

"About FSTC: FSTC History," FSTC, 2003.

American National Standard For Financial Image Interchange ("ANSI"): Architecture, Overview and System Design Specification, X9.xx 0.7, dated: 1994.

"ANSI/ABA X9.46–1995, Draft version 0.13, American National Standard for Financial Image Interchange: Architecture, Overview and System Design Specification."

"ANSI/ABA X9.46–1997, American National Standard for Financial Image Interchange: Architecture, Overview and System Design Specification." Copyright 1996.

Anderson, "Electronic Check and Check Law," letter to Robert Ballen, Apr. 8, 1996.

Ansi6v4.ppt—PowerPoint Presentation—FSTC—Financial Services Technology Consortium, Sep. 30 to Oct. 1, 1996.

"AT&T Global offers one–step imaging," American Banker, vol. 159, No. 39, p. 14A(1), Feb. 28, 1994.

"AT&T Partners with Fiserv to Form Single Source Provider for Leading Image Item Processing Solutions," PR Newswire, at 913CL011, Sep. 13, 1995.

Atzel, (email to Hambro, Oct. 9, 2001).

"At Your Service . . . ," Federal Reserve Bank of Kansas City, 1995.

"Baby boomers, Generation X are both addicted to ATM," AT&T News Release, Feb. 28, 1995.

"BancTec Inc. has received another order for its image statement processing product (First National Bank of Chicago orders)," Nov. 13, 1991.

BancTec's Proposal to the Federal Reserve Bank of Boston, "Technical Volume: Check Image Processing Archive and Retrieval System," Jul. 8, 1994, JPMC–BANCT 002960–003299 and JPMC–BANCT 001017–001144.

BancTec's Proposal to the Federal Reserve Bank of Boston, "Technical Volume: Total Solution Overview" Jul. 8, 1994, JPMC–BANCT 001017–001144.

Banet, B., "Document image processing, 1991: The imaging edge," Seybold Rep. on Publishing Systs, vol. 20, No. 19, Jun. 24, 1991.

"Bank Automation News," Finance & Banking Newsletter, vol. 9, Iss. 6, Apr. 2, 1997.

"Banks to Check Out Imaging (Solutions)," Communications Week International, 1992, No. 093, p. 46, Oct. 19, 1992.

Barhel, M., "NCR and Unisys exchange check images in a pivotal test (computer makers test compatibility of check imaging systems)," American Banker, vol. 158, No. 67, p. 3(1), Apr. 8, 1993.

Barthel, Matt, "Unisys, Banctec offer PC–based imaging: high–tech check statements produced; community banks are market," American Banker, vol. 157, No. 195, p. 3(1), Oct. 8, 1992.

Bartholomew, D., "More Checks on Checks—Bank of America plan to convert to an IBM imaging system that screens checks faster and more thoroughly (spotlight)," Informationweek, 1994, No. 504, p. 32, Dec. 5, 1994.

"Bill Processing: US West Re–Engineers with $7.2 Million Unisys Image–based Remittance Processing Solution," Edge, on & about AT&T, vol. 10, No. 378, Oct. 23, 1995.

Blankenhorn, D., "Cincinnati Bell and Unisys go into bank imaging," Newbytes, p. NEW10240020, Oct. 24, 1990.

Block, V., "USAA Federal gets imaging system," American Banker, vol. 159, No. 49, p. 6A(1), Mar. 14, 1994.

Booker, E., "Bank to test scalable NCR imaging for check processing," Computerworld, p. 66, Dec. 14, 1992.

Brown, J., "Imaging may dramatically alter bank data networks," Network World, vol. 6, No. 19, p. 6(2), May 15, 1989.

Buchok, J., "OCR gets processing credit," Computing Canada, vol. 19, No. 26, Dec. 20, 1993.

"Chase's New Image," Information Week, No. 517, at 14, Mar. 6, 1995.

Check[1].ppt—PowerPoint Presentation—Current Check Flow, Dec. 12, 1995.

"Check Image Exchange Project (a.k.a. Interbank Check Imaging Project)," at www.fstc.org/projects/imaging/index.cfm.

"Check–Image Interchange Inches Closer," Bank Technology News, vol. 10, No. 1, p. 19+, Jan. 1997.

"Checks & Checking: Check Imaging at the Teller Station (Alliance Integration & Services Introduces Imaging System that can be Installed at Bank Teller Stations)," Bank Technology News, Vol. 9, No. 10, at 37, Oct. 1996.

"Chemical Chooses IBM Check Imaging (Chemical Banking Corp to install IBM's ImagePlus High Performance Transaction System to process 9 mil checks daily)," Bank Technology News, vol. 8, No. 9, p. 11, Sep. 1995.

"Cincinnati Bell: CBIS & Unisys in Major Imaging Agreement," Edge, on & about AT&T, vol. 5, No. 118, Oct. 29, 1990.

"Cincinnati Bell Information Systems (Integrator Briefs)," Computer Reseller News, 1993, No. 534, p. 129, Jul. 12, 1993.

Complaint in *DataTreasury Corp.* v. *Bank One Corp.*, Cause No. 3–03CV0059–K, In the United States District Court for the Northern District of Texas, Dallas Division.

Complaint in *DataTreasury Corp.* v. *First Data Corporation, et al.*, Cause No. 502CV094, In the United States District Court for the Eastern District of Texas, Texarkana Division.

Complaint in *Data Treasury Corp.* v. *RDM Corp., a.k.a. Research Development and Manufacturing Corp.*, Cause No. 3–02CV2641–M, in the United States District Court for the Northern District of Texas, Dallas Division.

Complaint in *DataTreasury Corp.* v. *Ingenico S.A., et al.*, Cause No. 502CV095, In the United States District Court for the Eastern District of Texas, Texarkana Division.

Complaint in *DataTreasury Corp.* v. *J.P. Morgan Chase & Co., et al.*, Cause No. 502CV124, In the United States District Court for the Eastern District of Texas, Texarkana Division.

"Computerm Announces Remote Check Imaging Support for VMC 8200 High–Speed Channel Extension System," PR Newswire at 408LAM012, Apr. 8, 1996.

"Computerm Eases Remote Imaging," American Banker, vol. 158, No. 156, at 13A(1), Aug. 16, 1993.

"Computerm Enables Boatmen's Bancshares to Execute Remote Check Imaging," PR Newswire at 408LAM013, Apr. 8, 1996.

Cooney, M., "Frame relay comes to Computer extenders," Network World, Jun. 28, 1993.

Cortese, Amy, "Image Yields Interest at Banks (Collaboration Results in Imaging System to Automate Check Processing," ComputerWorld, at 6, Mar. 19, 1990.

Costanzo, C., "As Banks Cling to the Conventional, Check–Imaging Struts Its Stuff," Bank Technology News, p. 1, Mar. 1994.

Crockett, B., "Systematics to use deposited–check imaging; installation at firm's N.J. center would be the first to outsourcer," American Banker, vol. 158, No. 95, p. 3(1), May 19, 1993.

Crone, "Reducing Data Processing Costs with a Remote Item Processing System," Bank Administration, Oct. 1986, pp. 44–46.

Daly, B., "Unisys Acquires Visual Impact Solution for Check Processing, Archive and Image Delivery," Business Wire, p. 9181204, Sep. 18, 1997.

Daly, B., "Unisys provides services to Bank of the West to support retail banking," Business Wire, p. 9180098, Sep. 18, 1995.

"Data Compression Over Frame Relay Implementation Agreement FRF.9," Jan. 22, 1996, downloaded at http://www.frforum,com/5000/Approved/FRF.9/frf9.pdf.

"Defendans' Final Invalidity Construction Pursuant to Fourth Amended Docket Control Order and Patent Local Rules 3–3 and 3–6," pp. 1–21, Civil Action No. 5:03–CV–039 (DF), Dec. 13, 2005.

"Defendants Ingenico S.A. and Ingenico, Inc.'s Preliminary Invalidity Contentions," in *DataTreasury Corp.* v. *Ingenico S.A., et al.*, Cause No. 502CV095, In the United States District Court of Texas, Texarkana Division.

"Defendants' Preliminary Invalidity Construction Pursuant to Patent Local Rules 3–3 and 3–4," in *DataTreasury Corp.*, v. *First Data Corporation, et al.*, Cause No. 502CV094, In the United States District Court of Texas, Texarkana Division.

Depompa, Barbara, "IBM Adds Image–Based Check Processing," MIS Week, vol. 11, No. 12, at 12(1), Mar. 19, 1990.

Description of the IBM "3174 Network Processor," Oct. 7, 1992, found on the web at the URL: http://ecc400.com/ibm/controllers/314prod.htm and http://www.commercecomputer.com/3174.html.

Dinan, Painter & Rodite, "ImagePlus High Performance Transaction System," IBM Systems Journal, vol. 29, No. 3, 1990, pp. 421–434.

Document Image Report, InfraFed Touts Remote Services, vol. 6, Issue 25, Dec. 11, 1996.

Dowell, "Security," email to fstc–image, Apr. 27, 1996.

Durham, D., "Broadway & Seymour to Invest in Two Strategic Initiatives," Business Ire, p. 03151248, Mar. 15, 1995.

eCheck: Homepage, 2003.

Electronic Imaging '88—Advanced Printing of Paper Summaries, vol. 1, Anaheim, California, Mar. 1988.

Electronic Imaging'88—Advanced Printing of Paper Summaries, vol. 1, Oct. 3–6, 1988, Boston, MA.

E–mail of May 10, 2006 titled "USPTO Reexam. C.N 90/007,829, Requested Date: Nov. 25, 2005" from "PT" <admin@patentrakker.com>.

"Entrust Encryption and Digital Signature Explained," date unknown.

Evankovich, S., "Computer earns MCI 'Level 1' approval; Computer's industry exclusive native Frame Relay interface passes test for interoperability with MCI's Frame Relay services," Business Wire, Apr. 12, 1995.

Evans, J., "The end of the paper wait: document imaging (includes related articles on successful document imaging implementations at Borgess Medical Center, the Huntington Internal Medicine Group, the University of Alabama Health Services Foundation and Quest Diagnostic) (Industry Trend or Event)," Health Management Technology, vol. 18, No. 2, p. 16(5), Feb. 1997.

Fassett, W., "Impact of Imaging," Bank Management, vol. 67, No. 11, p. 56, Nov. 1991.

Federal Reserve Bank of Boston, "Request For Proposal For Check Image Processing And Archival And Retrieval Systems For The Federal Reserve," Apr. 21, 1994, JPMC 152558–152803.

Feighery, M., "NCR demonstrates systems for Insurance and accounting industry," AT&T News Release, May 31, 1992.

Feighery, M. and Bochonko, K., "NCR demonstrates full line of retail products at NRF conference," AT&T News Release, Jan. 18, 1993.

FileNet Product Brochure, "Introducing the Age of Document–Image Processing," The PC Connection, and Wide–Area Image Communication and System Networking, 1998, 14 pages.

"Financial EDI over the Internet," Bank of America, 1996.

Financial Services Technology Consortium ("FSTC") Interbank Check Imaging Project White Paper, dated: Jun. 20, 1994.

Fisher, M., "IBM, Customers continue work on document image processor," Datamation, vol. 34, No. 19, Oct. 1, 1988.

Fitch, "Digital image systems speed return items, exceptions," Corporate Cashflow, May 1996.

Fitch, T., "Check image capture speeds up positive pay reconcilement," Corporate Cashflow, Feb. 1995.

Friedman, D., "Nixdorf Computer Introduces DCPA Image—A Sophisticated Document Image Processing Sysyem With Unique Capabilities," PR Newswire, Aug. 15, 1989.

FSTC Check Image Interchange Project, dated: May 25, 1995.

FSTC Check Image Interchange Project Pilot Phase 1A: Preliminary Architecture and Project Plan, dated: Jun. 30, 1995.

"FSTC Check Image Quality Subproject," date unknown.

FSTC Compilation of ANSI X9.46, Data Structure Reference, dated: Jul. 31, 1995.

FSTC Demonstrates Interbank Check Image Pilot; Multi–Vendor System Speeds check Clearing, Cuts Fraud—FSTC Pilot Lays Foundation for "Paper Truncation," at www.fstc.org/projects/imageing/public/information.cfm, Dec. 12, 1995.

"FSTC Image Exchange," May 21, 1996.

FSTC Image Quality Functional Requirements, dated: Jul. 26, 1995.

FSTC Interbank Check Imaging: Unisys Monthly Status Report, Jun. 26, 1996.

"FSTC Interbank check Imaging: Unisys Monthly Status Report," Jul. 22, 1996.

FSTC Pilot Overview, dated: Apr. 3, 1995.

"FSTC: Projects—Check Image Exchange Project—Project Participants," at www.fstc.org/projects/imaging/participants.cfm.

FSTC Projects: The Bank Internet Payment System (BIPS): Leading the Way to Electronic Commerce, FSTC, 2003.

Garvey, M., "Check Processing Goes Digital—Chase Manhattan Bank to store checks electronically, saving time and money," Informationweek, 1997, No. 648, p. 20, Sep. 15, 1997.

Gawen, "PC Based Document Image Processing and Signature Verification," Proceedings of the Information & Image Management Conference, 1991, pp. 389–391.

"Global Concepts—Payment Systems Consulting," at www.global–concepts.com/image_archive.htm.

Griffith, M. and Mazzola, J., "National City, NCR form strategic imaging partnership," AT&T News Release, Nov. 9, 1992.

Gullo, K., "NCR, Unisys plan check imaging for IBM Systems," American Banker, vol. 156, No. 249, p. 1(2), Dec. 30, 1991.

Haig, J., "Unisys integrates retail/wholesale lockbox solution for remittance processors," Business Wire, p. 03251075, Mar. 25, 1997.

Haig, J., "Unisys solution will support check processing at Vermont Federal," Business Wire, p. 5201185, May 20, 1996.

Helm, Sylvia, "Banks check into image processing," Computers in Banking, vol. 7, No. 3, p. 25(7), Mar. 1, 1990.

Helm, S., "Who's doing what in image processing (includes definition of image processing," ABA Banking Journal, vol. 83, No. 1, p. 31(3), Jan. 1991.

"High Volume Data Capture Sans Paper" in Bank Systems Technology, May, 1996, p. 35.

Homa, "MICR Technology Helps Eliminate POS Check Fraud," Chain Store Age Executive, Sep. 1991.

Horine, J., "AT&T and Fiserv team to offer imaging solutions," Sep. 13, 1995.

"Huntington BancShares in the Forefront of Technology with Purchase of Unisys Check Imaging System," PR Newswire, p. 1, Oct. 11, 1989.

IBM Electronic Payment Systems Support/Check Processing Control Systems: Progress Reference and Operations Manual, dated: Jun. 1986.

"IBM FSTC Pilot Status".

IBM Product Announcement 190–040, (IBM 3898 Image Processor), dated: Mar. 13, 1990.

IBM's Proposal to the Federal Reserve Bank of Boston, Nov. 7, 1991, "IBM Proposal For FRB Phase Four: Image Archive System," JPMC 279955–280128, Yeskel Exhibit 1.

IBM Systems Journal, vol. 29, No. 3, 1990 (entire journal).

"IBM X9.46 Pilot Status—Summary," date unknown.

"Ibnamed, A Load Balancing Name Server Written in Perl," Sep. 17, 1995, located at the web at URL www.standford.edu/~schemers/docs/Ibnamed/Ibnamed.html.

"Ibnamed, A Load Balancing Name Server Written in Perl," Oct. 15, 2002, found on the web at the URL www.standford.edu/~schemers/docs/Ibnamed/Ibnamed.html.

"ICI Project Security Work Session," May 10, 1996.

Image Archive Forum Flow Nos. 1–13, Sep. 1997.

Image Archive Forum Methodology and Value, Sep. 19, 1997.

Image Archive Forum, "Payment Systems Task Force Economic Framework," Jan. 27, 1998.

ImagePlus brochure by IBM, 1991.

"Image Processing Survival Guide, vol. 11: Sure–Fire Strategies for Implementing Image Remittance," Philips Business Information, Inc. 1996.

"Image systems garner NOAC spotlight (American Bankers' Association's National Operations and Automation Conference)," Computer in Banking, vol. 6, No. 7, p. 8(4), Jul. 1989.

"Imaging in Corporate Environments: Technology and Communication," Daniel Minoli, McGraw Hill, 1994.

"Imaging products. Check Processing—IBM's ImagePlus High Performance Transaction System," United States Banker, vol. 100, No. 8, p. 23(3), Aug. 1990.

"Imaging vendors shape processing," Banking Management, vol. 69, No. 4, p. 29, Apr. 1993.

Imwalle, C. and Pratt, J., "250 U.S. banks to use NCR, Cincinnati Bell financial systems," AT&T News Release, May 4, 1993.

"Industry Security Leader Racal Supports Visa/Mastercard Proposal for Internet," PR Newswire, Apr. 17, 1996.

INSPEC search with abstracts.

"Interbank Check Imaging," FSTC General Meeting, Orlando; FL, Apr. 17, 1997 (Exhibit 20).

"Item processing leaps ahead with VisualImpact and Windows NT (Sponsored Supplement: Unlock Your Back Office with Microsoft Back Office)," US Banker, vol. 105, No. 6, p. S4(3), Jun. 1995.

Janusky, "FSTC Interbank Check Imaging," Apr. 29, 1996.

Janusky, "FSTC Interbank Check Imaging," May 22, 1996.

Joint Marketing & Referral Agreement Between ACS Image Solutions, Inc. and JPMorgan Chase Bank.

Jones, J., "Broadway & Seymour Announces Client/Server Product for Item and Image Processing," Business Wire, p. 03201186, Mar. 20, 1995.

Jones, J., "Broadway & Seymour announces new Visualimpact release," Business Wire, p. 3291274, Mar. 29, 1996.

Klein, M., "Terminal Data to supply NCR with document microfilmers," AT&T News Release, Oct. 13, 1993.

Kraynak Maxfield, J., "Signet Processes Over 2,500 Documents/Hour in Unisys Check Imaging Tests," PR Newswire, p. 0409P8428, Apr. 9, 1991.

Kriskern, J., "Engineering a visionary solution," Datamation, vol. 36, No. 8, Apr. 15, 1990.

Kutler, J. "AT&T, IBM, Unisys join bank research group," American Banker, vol., 159, No. 124, p. 14(1), Jun. 29, 1994.

Lubetkin, S., "Unisys enters image processing market with two new products and major financial and industrial customers (product announcement)," PR Newswire, p. 1011PH009, Oct. 11, 1989.

"MAGTEK® Company Background & Product Guide," date unknown (Exhibit MagTek D–7).

"MagTek Unveils Excella, a Dual–side Scanner for Check 21 Applications," May 10, 2004 (Exhibit MagTek D–8).

Mantel, K., "Notes Gets in the Picture," Datamation, Jul. 15, 1992.

Marjanovic, "Payment Groups Square Off Over Electronic Check Plan," American Banker, date unknown.

Marjanovic, S., "Mich. National streamlines imaging with IBM system (check imaging)," American Banker, vol. 160, No. 176, Sep. 13, 1995.

Marjanovic, Steven, "Home Loan Bank to Offer Check–Image Statements to Members' Customers," American Banker, vol. 159, No. 248, at 14(1), Dec. 29, 1994.

Mazzola, J., "NCR and NYCH to develop image–based check notification system," AT&T News Release, Aug. 24, 1992.

Mazzola, J. and Hendrickson, L., "NCR deposit processing technology speeds banking operations," AT&T News Release, Dec. 7, 1992.

Mazzola, J. and Hendrickson, L., "Wachovia tests NCR's new imaging item processing system," AT&T News Release, Nov. 15, 1991.

Mazzola, J., Hendrickson, L., and Waters, R., "NCR, CKI to market image–based credit card chargeback system," Jan. 6, 1993.

Mazzola, J. and O'Donohue, M., "Frost National Bank selects NCR over old mainframe environment," AT&T News Release, Apr. 28, 1993.

McGinn, Janice, "IBM ImagePlus High Performance Transaction System (IBM Harnesses Image Processing to Make its 389x/XP Cheque Processors More Efficient)," Computergram International, No. 1389, at CG103210008, Mar. 21, 1990.

McKee, K., and Gundlach, D., "Retail Banking Solution enhanced," AT&T News Release, May 21, 1990.

Messmer, E., "Hurdles stand in way of electronic banking," Network World, p. 33, Sep. 4, 1995.

"Microsoft Introduces SNA Server Version 3.0, Begins Beta Testing," Microsoft Press Release, Aug. 29, 2006, found at: http://www.microsoft.com/presspass/press/1996/jun96/sna30pr.mspx.

Moore, J., "IBM, Unisys test check systems for Fed Reserve," Federal Computer Week, vol. 6, No. 21, p. 6(2), Jul. 27, 1992.

Moreau, Thierry, "Payment by Authenticated Facsimile Transmission, a Check Replacement Technology for Small and Medium Enterprises," Nov. 25, 2006, found at: http://connotech.com/PAYPROC.HTM.

Morris, H.M. and Orth, R.H., Image system communications, IBM Systems Journal, vol. 29, No. 3, 1990, pp. 371–383.

Murphy, P., "POD Check Imaging Faces Challenges (In 1995 vs. 1996, banks raised Investment in check imaging by 9% from $198 mil and $215 mil; new lost cost POD technology keeps costs down)," Bank Technology News, vol. 10, No. 3, p. 23, Mar. 1997.

"NCReports: Financial Services Trends and Technologies," Issue 1, NCR, Jan. 1997.

"NCReports: Financial Services Trends and Technologies," Issue 2, NCR, Jan. 1997.

"NCReports: Financial Services Trends and Technologies," Issue 3, NCR, Jan. 1997.

"NCReports: Financial Services Trends and Technologies," Issue 4, NCR, Jan. 1997.

"NCReports: Financial Services Trends and Technologies," Issue 5, NCR, Jan. 1997.

"NCReports: Financial Services Trends and Technologies," vol. 1, Issue 6, NCR, Jan. 1997.

"NCReports: Financial Services Trends and Technologies," vol. 1, Issue 7, NCR, 1997.

"NCReports: Financial Services Trends and Technologies," vol. 1, Issue 8, NCR, 1999.

NCR 7780 Brochure, copyrighted 1989.

"NCR—Hardware—7780 Mid–Range Item Processing Transport," at www.ncr.com/products/hardware/hw_7780_product.htm.

"NCR—Hardware—7780, Technical Specifications," at www.ncr.com/products/hardware/nw_7780_product.htm.

"NCR offers new image–based Document Management System," AT&T News Release, Jun. 23, 1992.

"NCR Unveils Client–Server Check Imaging," Bank Technology News, vol. 9, No. 3, p. 23, Mar. 1, 1996.

Nixon, B., "Is check imaging for you? (automation in banking) (includes related article)," Savings & Community Banker, vol. 2, No. 10, p. 28(6), Oct. 1993.

No1016v4[1].ppt—PowerPoint Presentation—FSTC—Interbank Check Image Project, Sep. 30 to Oct. 1, 1996.

"NSSDC's Mass Storage System Evolves," Mar. 1995, found on the web at the URL: http://nssdc.gsfc.nasa.gov/nssdc_news/march95/09_i_behnke0395.html.

O'Heney, S., "Prepare for the image revolution (Banker and Vendors) (image processing: includes related article listing image processing products) (buyers guide)," Computers in Banking, vol. 6, No. 10, p. 24(6), Oct. 1989.

"On the imaging technology front," American Banker, vol. CLXI, No. 68, p. 26, Apr. 10, 1996.

PACESBusReq3[1].doc—Microsoft Word Doc—"PACES Paperless Automated Check Exchange & Settlement—Business Requirement," Apr. 3, 1998.

PacesOverview40[1].ppt.—PowerPoint Presentation.

PACESPRO[1].doc—Microsoft Word Doc—"PACES Paperless Automated Check Exchange & Settlement—Project Proposal," Apr. 23, 1998.

PACESRequirements[1].doc—Microsoft Word Doc—"PACES Paperless Automated Check Exchange & Settlement—Requirements Document," Apr. 3, 1998.

"PACES Models—FSTC Project," presentation by Mariano Roldan on Jul. 17, 1997 (Exhibit 21).

"PACES Paperless Automated Check Exchange & Settlement Next Step," presentation by John Fricke at New York, NY on Aug. 12, 1997 (Exhibit 19).

Plesums, C.A. and Bartels, R.W., Large Scale Image Systems: USAA Case Study, IBM Systems Journal, vol. 29, No. 3, 1990, pp. 343–355.

"Preliminary Invalidity Contentions of Defendants J.P. Morgan Chase & Co. and JPMorgan Chase Bank," in *DataTreasury Corp. v. J.P. Morgan Chase & Co., et al.*, Cause No. 502CV124, In the United States District Court for the Eastern District of Texas, Texarkana Division.

"Press Release, Cisco Partners with AT&T on Network Switch Manufacturing," Sep. 26, 1995, found on the web at http://www.lucent.com/press/0995/950926.mma.html.

Press Release "MagTek Adds Enhanced Reading to MicrimageTM," Jan. 9, 2003 (Exhibit MagTek D–11).

Press Release "MagTek Upgrades Its MicrimageTM Check Reader/Scanner," Jun. 12, 2002 (Exhibit MagTek D–9).

Press Release "MagTek's MICRImage Transmits Check Images at Speed of Ethernet," Feb. 14, 2002 (Exhibit D–10).

Press Release, "NCR Document Management System Includes Kodak, Ricoh Products," Apr. 6, 1993.

Press Release, "NCR Introduces Scalable Image Item Processing Solution," Jan. 19, 1996.

"Regions Bank Selects ImageSoft to Provide Image Solutions," Business Wire, at 9161220, Sep. 16, 1997.

Rivest, R.L., Shamir, A., Adleman, L., "A Method for Obtaining Digital Signatures and Public–Key Cryptosystems," date unknown.

Robinson, G., "Universal Card purchases BancTec ImageFIRST system," AT&T News Release, Dec. 22, 1992.

Roldan, Jr. "Image Quality White Paper," FSTC, 1999.

Roldan, M., "Paperless Automated Check Exchange and Settlement (PACBS) (status update) (PACES completes specification and design of image exchange environment and is accepted as part of SVPCO Image Strategy," FSTC, at www.fstc.org/projects/paces/index.cfm, Jun. 22, 2000.

Roldan, Mariano, Financial Services Technology Consortium, "PACES Paperless Automated Check Exchange & Settlement Project Overview, PACES Planning Meeting, New York City," Dec. 19, 1997.

Schwartz, J., "Banks to Test Imaging for Clearing Checks," Communications Week, No. 420, p. 35, Sep. 14, 1992.

Search Report for PCT/US00/33010, Jun. 21, 2002.

Softchec Licenses 'Envision' Image Solution to West Suburban Bank, PR Newswire, at 116SETUU002, Jan. 16, 1996.

"Special Report: Fine Tunning of the Terminal Picture," Computerworld, Aug. 1983.

Spencer. H., "Scanning goes vertical: a big future for specialized check scanning; check scanning technology," Advanced Imaging, No. 10, vol. 12, p. 54, Oct. 1997.

Stellwag, C., "New ATM from AT&T GIS features automated document processing," AT&T News Release, Nov. 29, 1994.

Stellwag, C. and Bochonko, K., "NCR and Cincinnati Bell offer image processing service," AT&T News Release, Jan. 11, 1994.

Stellwag, C. and Bochonko, K., "Norwest Bank selects NCR item processing systems for lockbox," AT&T News Release, Aug. 2, 1993.

Stellwag, C., Graves, T., and Bochonko, K., "New Mexico uses NCR imaging systems for tax, revenue processing," AT&T News Release, Jul. 12, 1993.

Stellwag, C., Proto, J., and Bochonko, K., "Cashflex selects NCR item processing systems for lockbox," AT&T News Release, Jul. 12, 1993.

Stellwag, C., Roedel, R, and Bochonko, K., "NCR and Arkansas Systems announce strategic alliance," AT&T News Release, Jul. 12, 1993.

Stellwag, C., Sanders, G., and Bochonko, K., "NCR and Signet Banking to provide item processing services," AT&T News Release, Jul. 13, 1993.

"SurePOS ACE Electronic Payment Support PRPQ for 4690 OS," Version 1, Release 5, IBM, 1998, 2002.

"The Check Information Age: Vision Executive Summary Image Archive Forum, Payment System Task Force," Jan. 27, 1998.

"The Wachovia Story," Research, Development Manufacturing Corporation, 1993.

"The New Era of Check Scanning Technology," 2005 (Exhibit MagTek D–6).

Tracey, Brian, "IBM Unveils First Stage of Image–Check System," Computers in Banking, vol. 7, No. 4, at 12(3), Apr. 1990.

Tucker, T., "Broadway rolls out check imaging system for community banks," American Banker, vol. 160, No. 61, p. 14(1), Mar. 30, 1995.

"Understanding EDI," 1996.

"Unisys Enhances Check Imager (Unisys Corp makes effort to appeal to wider range of financial institutions)," American Banker, vol. CLIX, No. 205, p. 15A, Oct. 24, 1994.

Unisys, New York Clearing House, "A Proposal for an Image–Based Return Item Processing System," Jun. 1991, Unisys Document No. PDC 1010–16, JPMC–NYCH018091–018216.

"Unisys Wins Contract to Supply Imaging Solution to Chase Manhattan/FISER V Check Processing Alliance," Business Wire, at 6121175, Jun. 12, 1995.

"Unix–Based Image Statement Software," ABA Banking Journal, vol. 85, No. 2, at 80(1), Feb. 1993.

"Verifone Software Links PCs to the Point of Sale," American Banker, vol. 158, No. 156, at 13A(1), Aug. 16, 1993.

Vermeire, "Prosecution of Check Image Patent," letter to Hanna, Jul. 11, 1997.

Wagner, M., "Banc One checks out Web," Computerworld, vol. 30, No. 35, p. 69, Aug. 26, 1996.

Western Bank purchases NCR's Document Managing system, AT&T News Release, Aug. 31, 1993.

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–6 is confirmed.

* * * * *